United States Patent [19]

Huhta-Koivisto

[11] 3,855,005

[45] Dec. 17, 1974

[54] DEVICE IN A GALVANIC BATTERY FOR REMOVING AIR FROM THE ELECTROLYTE AND WATER SUPPLY DUCTS AND FROM THE ELECTROLYTE TANK WHEN THE BATTERY IS STARTED

[75] Inventor: Esko Ensio Huhta-Koivisto, Helsinki, Finland

[73] Assignee: Puolustusministerio, Helsinki, Finland

[22] Filed: Oct. 16, 1972

[21] Appl. No.: 297,954

[52] U.S. Cl. .............................. 136/100 R, 136/162
[51] Int. Cl. ............................................ H01m 1/06
[58] Field of Search....... 136/83 R, 100 R, 160, 162

[56] References Cited
UNITED STATES PATENTS

| | | | |
|---|---|---|---|
| 2,921,111 | 1/1960 | Crowley et al..................... | 136/162 |
| 3,247,024 | 4/1966 | Tanninen........................... | 136/160 |
| 3,257,241 | 6/1966 | Tanninen........................... | 136/160 |
| 3,498,845 | 3/1970 | Koivisto............................ | 136/162 |

Primary Examiner—Donald L. Walton
Attorney, Agent, or Firm—Richards & Geier

[57] ABSTRACT

Device in a galvanic battery for removing air, when the battery is started, from the electrolyte and water supply ducts and from the electrolyte tank, which battery has a cell system most appropriately consisting of bipolar electrode plates, in which battery there is at the juncture of the initial electrolyte supply duct, the supply duct for the electrolyte proper and the electrolyte inlet duct there is a two-position valve device having a venting duct, and that the design of the movable valve member or members is such that they move under effect of the initial electrolyte pressure into a first position in which the initial electrolyte flow has access of the inlet duct and the venting duct opens into the electrolyte supply duct, and that the movable valve members move into their second position under the pressure of the electrolyte proper, in which second position the initial electrolyte supply duct is closed and the flow of electrolyte proper has access of the inlet duct while at the same time the venting duct closes.

6 Claims, 5 Drawing Figures

PATENTED DEC 17 1974 3,855,005

DEVICE IN A GALVANIC BATTERY FOR REMOVING AIR FROM THE ELECTROLYTE AND WATER SUPPLY DUCTS AND FROM THE ELECTROLYTE TANK WHEN THE BATTERY IS STARTED

The present invention concerns in a galvanic battery a device for removing air, when starting the battery, from the electrolyte and water supply ducts and from the electrolyte tank, the cell system of which battery consists most appropriately of bipolar electrode plates consisting for instance of zinc and carbon and is supplied with electrolyte through an inlet duct, said electrolyte being composed of water supplied into the battery and of at least one electrolyte component, which is conducted into the electrolyte inlet duct from an electrolyte tank, and which battery for the purpose of initiating its operation comprises an initial electrolyte tank, whence under effect of a particular pressure source the ready-made initial electrolyte is conducted into the cell system through said inlet duct.

In a number of battery applications, such as when they are used in airplanes, missiles, torpedoes, various types of emergency power sources and start-up duties, a battery is required which supplies energy at a high power rate yet during a comparatively short running period. In addition, these batteries are required to have a favourable power/weight ratio and good storage tolerance as well as a substantially constant voltage throughout the running period.

Prior art includes, in the applications mentioned, various types of batteries which are activated when the demand for power begins, by filling the cell system of the battery with electrolyte and forcing the electrolyte to circulate in the cell system. The cell system has been dry prior to activation, whereby the battery has a good storage tolerance. An example of a battery of this kind is the sea-water battery used in electric torpedoes, wherein the electrode plates consist of magnesium and silver chloride and sea water serves as electrolyte. A battery type with less expensive electrode materials than the preceding type is one wherein zinc, or another equivalent metal, constitutes the negative electrode and carbon, or a mixture of carbon and graphite, the positive electrode and wherein a mixture of sulphuric and chromic acid serves as electrolyte. Various batteries of the afore-mentioned kinds have been disclosed e.g. in the Finnish Pat. No. 37.338 (corresponds to the U.S. Pat. No. 3,498,845) and in U.S. Pat. Nos. 2,921,111, 3,257,241 and 3,247,024. These batteries of prior art comprise, for the purpose of initiating the battery's operation, an initial electrolyte tank, whence by effect of a particular pressure source the ready-made initial electrolyte can be forced into the cell system of the battery. It can be achieved by expedient design of the cell system that the air present in the cell system escapes along with the initial electrolyte.

Attempts have previously been made to avoid the problems of air removal by applying a vacuum technique, which implies that the air is evacuated from the battery cell system and from the water and electrolyte supply pipes prior to commissioning the battery for operation. However, this technique imposes high requirements on the tightness of the cell system and pipes, and it is not possible, within reasonable cost, in practice to make the structures of the battery tight enough for the battery to be preserved airless over prolonged storage periods. As has been said, the air escaping from the battery cell system along with the initial electrolyte causes no appreciable problems, since the battery does not yet operate at full power. If the initial electrolyte has already started the battery and at this stage air is introduced into the battery cell system from the electrolyte tank and from the water and electrolyte supply ducts, the consequences are catastrophal because the air accumulates in the upper parts of the electrolyte flow paths. In that case, while the battery already operates at high output, the small electrolyte quantity present, in addition to air, in these flow paths begins to boil and this results in phenomena of explosive character, which destroy the battery.

The aim of the present invention is to avoid the above-mentioned drawbacks, caused by air introduced into the battery cell system, by means of a simple device, which is reliable in operation.

The air removing device according to the invention is mainly characterized in that at the juncture of the initial electrolyte supply duct, the supply duct of the electrolyte proper and the electrolyte inlet duct there is a two-position valve having a venting duct, and that the design of the movable valve member is such that, under the initial electrolyte pressure, it goes into the position wherein the initial electrolyte flow can enter the inlet duct and the venting duct communicates with the electrolyte supply duct, and that the movable valve member goes into the other position under effect of the pressure of the electrolyte proper, in which other position the initial electrolyte supply duct is closed and the flow of electrolyte proper can enter the inlet duct, while at the same time the venting duct is closed.

The invention is described in detail in the following with reference to the embodiment example shown in the figures of the attached drawing, but to which the invention is in no way confined. In the drawing, FIG. 1 shows the general block diagram of a battery according to the invention.

FIG. 2 shows the two-position valve device in the first position, in which the initial electrolyte has access to the cell system and the air can escape from the water and electrolyte supply ducts.

FIG. 3, again, shows the two-position valve device in its second position.

Figure 1:
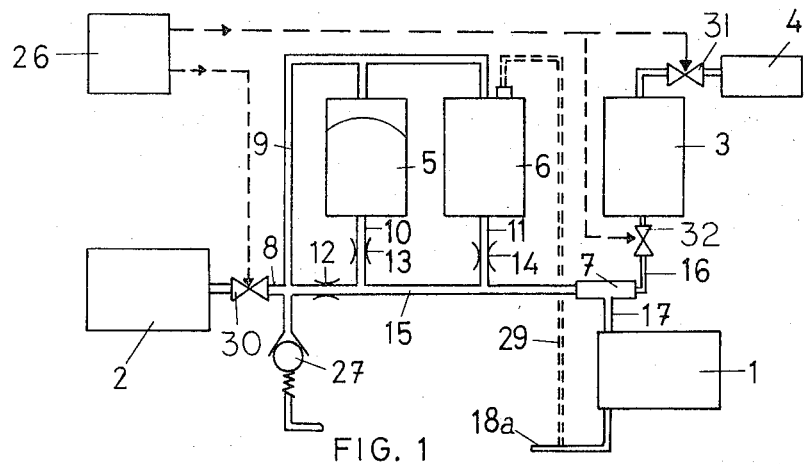

The cell system 1 of the battery shown in the drawing consists, for instance, of bipolar zinc-carbon electrode plates, into the interstices of which electrolyte is supplied through the inlet duct 17. If the battery operates according to the electrolyte through-flow principle, the used electrolyte escapes by the exit duct 18a. It is possible, however, to apply the venting arrangement according to the invention also in batteries with closed electrolyte circulation. For the purpose of supplying water and electrolyte components, such as sulphuric and chromic acids, the battery comprises a pressure source 2 with valve 30. After the pressure source 2, the water supply duct 8 divides into the electrolyte supply duct 15, into which the electrolyte component supply pipes 10 and 11 open, and another water supply duct 9, by which the supply pressures for the electrolyte components are produced in the electrolyte tanks 5 and 6. The pressure source 2 may be, for instance, a pump, which in applications involving propagation of the battery through water, such as torpedoes, may be replaced by devices producing dynamic water pressure.

The embodiment example displays two electrolyte tanks 5 and 6, one of these tanks, 5, containing e.g. sulphuric acid and the other, 6, chromium salt, such as chrome trioxide, which forms chromic acid when solved in the water supplied through the duct 9, whereby a mixture of sulphuric and chromic acids serves as electrolyte in the battery. An equivalent, ready-made acid mixture is also provided in the initial electrolyte tank 3. The sulphuric acid is disposed in the tank 5 in a compressible bag made of an appropriate material, whence the sulphuric acid is driven by the water pressure through the electrolyte supply pipe 10 into the electrolyte supply duct 15. The electrolyte component supply pipes 10 and 11 and the initial part of the supply duct 15 contain flow throttling members 13 and 14, and 12, respectively, by means of which, firstly, the pressure distribution is arranged to be such that a flow of the electrolyte components into the supply duct 15 is achieved in the first place. The second purpose of these throttling members 12, 13 and 14 is that with their aid the quantitative ratios of the different electrolyte components and of water, and the electrolyte concentration, are maintained constant. In order to maintain a constant supply pressure, independent of pressure variations of the pressure source 2, a pressure regulating valve 27 has been fitted after the valve 30.

For initiation of the battery's operation, the battery comprises an initial electrolyte tank 3, to which over a valve 31 a particular pressure vessel 4 has been connected, under the pressure of which, after the valves 31 and 32 have been opened, the initial electrolyte is driven through the initial electrolyte supply duct 16 into the cell system 1.

For starting the battery, the valves 30, 31 and 32 are opened simultaneously or with mutual delay times that have been found appropriate, on the basis of commands from the valve governing unit 26.

Since the supply pipes and ducts 8, 9, 10, 11 and 15 and the electrolyte tank 6 contain air prior to starting the battery, at the juncture of the initial electrolyte supply duct 16, the supply duct 15 for the electrolyte proper and the electrolyte inlet duct 17 a venting valve 7 has been provided, in which capacity serves a two-position valve having in a valve body 18 a movable valve member 19. The valve body has been depicted as a cylindrical tube with the supply ducts of the electrolyte proper and of the initial electrolyte, 15 and 16 respectively, opening into its opposite ends. Also into this valve body 18 opens the inlet duct 17, which conducts the electrolyte into the cell system 1. The valve body 18 has been provided with a venting aperture 21, and the movable valve member 19 with a venting duct 20.

Figures 2, 3:
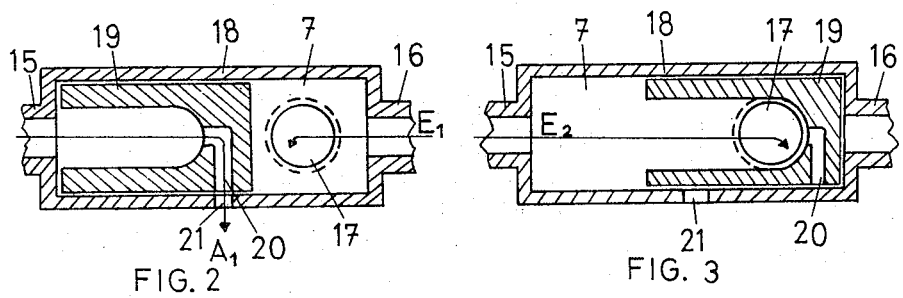
Figures 4, 5:
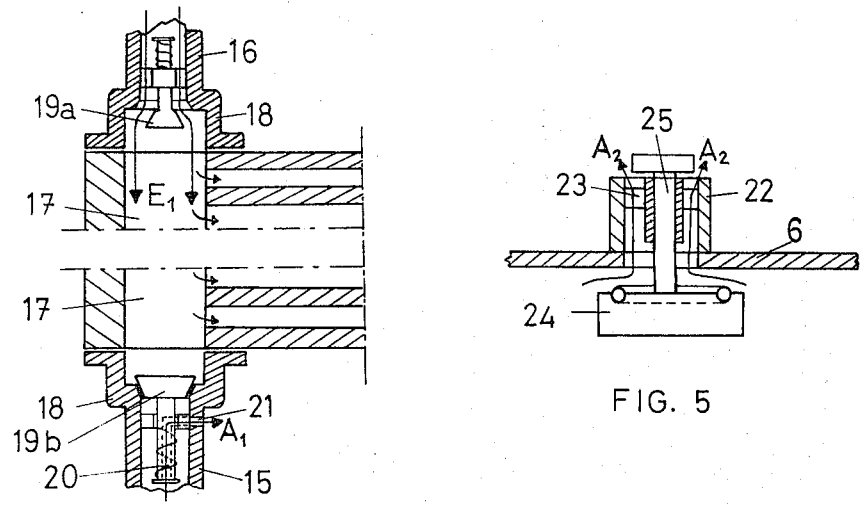
FIG. 4 shows an embodiment example of said valve device, with the valve in said first position.
FIG. 5 shows the venting valve of the electrolyte tank.

In the valve position of the valve 7 as in FIG. 2, the valves 31 and 32 have been opened and the pressure of the initial electrolyte acts on one end face of the movable valve member 19, shifting it into the position of FIG. 2. The initial electrolyte flow $E_1$ is then admitted through ducts 16 and 17 into the cell system 1. At the same time, communication has been established between the venting aperture 21 and venting duct 20, and under effect of the pressure source an air flow $A_1$ is produced through said aperture 21 and duct 20. When the air has been completely drained from the pipes and ducts 9, 10, 11 and 15, the electrolyte fills the valve 7. Since the flow resistance of the venting aperture 21 and venting duct 20 is several orders higher for liquid than for air, a pressure higher than the initial electrolyte pressure is then built up on the left side of the valve and the movable valve member 19 goes from the position of FIG. 2 into that shown in FIG. 3, whereby the initial electrolyte flow $E_1$ ceases with closure of its flow path, and at the same time the flow of electrolyte proper, $E_2$, starts through the supply duct 15 and inlet duct 17. The air flow path 19, 21 is also blocked when the aperture 21 closes. These actions are achieved in the venting valve 7 of FIGS. 2 and 3 by means of a movable, cylindrical valve member 19, which has on its left side a depression, through which the flow of electrolyte proper $E_2$ gains access of the inlet duct 17, while at the same time the venting aperture 21 closes. The same actions may be achieved by the aid of many valve designs of different kinds, e.g. by that shown in FIG. 4. This valve device consists of two separate parts placed in both ends of the electrolyte inlet duct 17, which is e.g. vertical, in the cell 1 of the battery. In FIG. 4 the valve device has been depicted in its first position, in which the initial electrolyte flow $E_1$ has access to the inlet duct 17 and the venting duct 20, 21 has opened into the electrolyte supply duct 15. The valve member 19a movable in the part of the valve device adjacent to the supply duct 16 constitutes a spring-loaded check valve; correspondingly the valve member 19b movable at the opposite end of the inlet duct 17 acts as a spring-loaded check valve. In addition, the stem of the valve member 19b has been provided with a venting duct 20, which is in register with the venting aperture 21 in the valve body 18 when the valve member 19b is in closed position.

In order to remove the air from the electrolyte tank 6, which is for instance a chrome trioxide tank, a venting valve 22 has been provided in the upper end wall of this tank 6, which valve can be designed in a number of ways. According to FIG. 5, the venting valve consists e.g. of a valve disk 24 with float action, which attaches to the body of the venting valve 22 by slide fit between the stem 25 and sleeve 23. In the position depicted in FIG. 5, the air can escape from the tank 6 as a flow $A_2$. As the liquid level rises in the tank 6, the valve 22 closes. According to FIG. 1, the venting valve 22 may be replaced by a small cross section flow path 29 opening into the electrolyte exit duct 18. The air may escape through this flow path 29, but the flow of liquid admitted by it is very small and negligible, owing to the high flow resistance.

In addition to efficient removal of air, the advantage is gained by means of a device according to the invention, that the initial electrolyte cannot enter the water and electrolyte proper supply ducts when the battery is started, and filling of the initial electrolyte tank 3 and of the supply duct 16 with electrolyte proper is also prevented.

I claim:
1. In combination with a galvanic battery having a cell system consisting of bipolar electrode plates, a device for removing air from the battery, said device comprising an electrolyte inlet duct connected with said cell system, a venting valve connected with said inlet duct, a second duct connected to one side of said venting valve, a third duct connected to another side of said venting valve, a first valve connected with said third duct, an initial electrolyte tank connected with said first valve, a second valve connected with said initial electrolyte tank, a pressure source connected with said second valve, a second electrolyte tank, means connecting said second and third tanks at a spaced interval to said second duct, a water supply duct connected with the second and third tanks, whereby electrolyte consisting of water and an electrolyte component is supplied to said cell system, and a two-position valve device connected with said second duct, said water supply duct and said first and second valves and having movable valve members movable under initial electrolyte pressure into a first position wherein initial electrolyte flow passes through said inlet duct and said first and second valves open into said second duct, said movable valve members being movable under electrolyte pressure into a second position wherein said third duct and said first and second valves are closed and electrolyte proper flows through the inlet duct.

2. A device according to claim 1, wherein said twoposition valve device comprises a cylindrical valve body and a piston-like valve member movable in said cylindrical body, said cylindrical body having an opening communicating with said second duct, and an opposed opening communicating with said third duct, said cylindrical body having a venting aperture, said piston-like member having a venting duct which is in register with said venting aperture in said first position.

3. A device according to claim 1, wherein said venting valve comprises two separate valve members constituting check valves and movable in opposite directions, one of said check valves admitting the flow of initial adhesive into said inlet duct, the other one of said check valves admitting the flow of electrolyte proper, said other check valve having a venting duct.

4. A device according to claim 3, wherein said two check valves are located on opposite sides of said inlet duct.

5. A device according to claim 1, comprising a venting valve carried on the upper end wall of said third electrolyte tank, which closes when liquid in the tank rises to its level.

6. A device according to claim 1, comprising a narrow flow path connecting the upper part of said third electrolyte tank with said cell system.

* * * * *